United States Patent [19]
Miyamoto et al.

[11] Patent Number: 5,106,536
[45] Date of Patent: Apr. 21, 1992

[54] α-TYPE TITANYL PHTHALOCYANINE COMPOSITION, METHOD FOR PRODUCTION THEREOF, AND ELECTROPHOTOGRAPHIC SENSITIVE MATERIAL USING SAME

[75] Inventors: Eiichi Miyamoto; Nariaki Mutou; Tooru Nakazawa, all of Osaka; Tatsuo Maeda, Nishinomiya, all of Japan

[73] Assignee: Mita Industrial Co., Ltd., Osaka, Japan

[21] Appl. No.: 574,851

[22] Filed: Aug. 30, 1990

Related U.S. Application Data

[62] Division of Ser. No. 261,896, Oct. 25, 1988, Pat. No. 4,971,877.

[30] Foreign Application Priority Data

Oct. 26, 1987 [JP] Japan ................. 62-271319
Nov. 30, 1987 [JP] Japan ................. 62-301707

[51] Int. Cl.$^5$ .................. H01C 13/02; G03G 5/06
[52] U.S. Cl. ..................... 252/501.1; 540/140; 540/141; 430/76; 430/78
[58] Field of Search ............ 540/140, 141; 430/76, 430/78; 252/501.1

[56] References Cited

U.S. PATENT DOCUMENTS

| | | | |
|---|---|---|---|
| 3,252,991 | 5/1966 | Schmidt et al. | 540/132 |
| 3,816,118 | 6/1974 | Byrne | 148/26 |
| 4,106,935 | 8/1978 | Petruzzella | 530/64 |
| 4,664,997 | 5/1987 | Suzuki et al. | 540/141 |
| 4,971,877 | 11/1990 | Miyamoto et al. | 530/76 |

FOREIGN PATENT DOCUMENTS 0123577 10/1984 European Pat. Off. .
0129413 12/1984 European Pat. Off. .
0180930 5/1986 European Pat. Off. .
62-178266 6/1987 Japan .

OTHER PUBLICATIONS

European Search Report, The Hague, Apr. 25, 1990.

Primary Examiner—Mukund Shah
Assistant Examiner—Y. N. Gupta
Attorney, Agent, or Firm—Beveridge, DeGrandi & Weilacher

[57] ABSTRACT

A stable α-type titanyl phthalocyanine composition including an α-type titanyl phthalocyanine and a metal-free phthalocyanine is disclosed having a wide range of absorption wavelengths and high in spectral sensitivity. The method for making the phthalocyanine composition is carried out by pigmenting a concentrated sulfuric acid solution containing at least titanyl phthalocyanine by an acid paste process. The concentrated sulfuric acid solution is poured into water to produce an α-type titanyl phthalocyanine composition which is stable to withstand the impact of aging. Also disclosed is an electrophotographic sensitive material which includes a sensitive layer having the α-type titanyl phthalocyanine composition superposed on an electroconductive substrate. This electrophotographic sensitive material excels in its charging property and its dark attenuation property and exhibits high sensitivity and low residual potential. The electrophotographic sensitive material having a sensitive layer comprising the α-type titanyl phthalocyanine composition and an electric charge transferring material can also be superposed on an electroconductive substrate. This electrophotographic photosensitive material exhibits an oxidation potential in the range of 0.45 to 0.65 eV, enjoys high sensitivity, and shows low residual potential.

13 Claims, 3 Drawing Sheets

α-TYPE TITANYL PHTHALOCYANINE CONTENT
(% BY WEIGHT)

α-TYPE TITANYL PHTHALOCYANINE COMPOSITION, METHOD FOR PRODUCTION THEREOF, AND ELECTROPHOTOGRAPHIC SENSITIVE MATERIAL USING SAME

This application is a divisional application of U.S. Pat. application Ser. No. 07/261,896, filed on Oct. 25, 1988, now U.S. Pat. No. 4,971,877, which application is relied on and incorporated herein by reference.

BACKGROUND OF THE INVENTION

This invention relates to an o-type titanyl phthalocyanine composition used advantageously as a sensitive material in an image forming device such as a copying machine or a laser beam printer, to a method for the production of the composition, and to an electrophotographic sensitive material using the composition.

As sensitive materials for such image forming devices as copying machines, electrophotographic sensitive materials using such photoconductive substances as phthalocyanines have found extensive utility.

In recent years, the laser beam printer using a semiconductor laser as a light source thereof and enjoying various advantages such as permitting reduction in size of apparatus and enabling images of high quality to be quickly produced by a non-impact process has been disseminating. Various studies are now under way in search of photoconductive substances fit for use as sensitive materials available for the laser beam printer.

The electrophotographic process using the laser beam printer quality sensitive material comprises a charging step for uniformly charging a sensitive material by corona discharge, an exposing step for exposing the charged sensitive material through the image of an original to a semiconductor laser thereby forming on the sensitive material a latent electrostatic image corresponding to the image of the original, etc. Quantity production of electrophotographic copies is attained by repeating the electrophotographic process mentioned above.

In the charging step, the sensitive material is required to manifest a satisfactory charging property and suffer only from small dark attenuation. In the exposing step, it is required to exhibit high sensitivity to wavelengths approximately in the range of 780 to 820 nm, the wavelengths inherent in the semiconductor laser and suffer sparingly from residual potential after the exposure to the semiconductor laser. The sensitive material is also required to suffer sparingly from deterioration of the properties mentioned above during the course of repeated use.

As photoconductive substances capable of fulfilling these requirements, phthalocyanine compounds which exhibit high sensitivity to wavelengths falling in the aforementioned range of wavelengths inherent in the semiconductor laser. Some of the phthalocyanine compounds are metal-free phthalocyanines which are devoid of a central metal and the remainder phthalocyanine compounds are metal phthalocyanines which are possessed of a central metal. They are otherwise classified by the crystal form under α type, β type, γ type, etc.

They differ not only in stability but also in absorption spectrum, depending on the existence or nonexistence of a central metal, the kind of the central metal, and the crystal form. These differences have a significant effect upon the charging property and the sensitivity.

To be more specific, some of the metal-free phthalocyanines excel in photoconductivity and exhibit high sensitivity to wavelengths in the aforementioned range (about 780 to 820 nm).

The metal-free phthalocyanines possess a metastable crystal form. It is, therefore, difficult to obtain a sensitive material possessing stable properties from a metal-free phthalocyanine.

Metal phthalocyanines such as copper phthalocyanine occur in various crystal forms such as α type, β type, γ type, and ε type. It has been known that the ε-type copper phthalocyanine among other crystal forms possesses an absorption zone on the long wavelength side and exhibits spectral sensitivity also on the long wavelength side (Denshishashin Gakkaishi [Journal of Electrophotographic Society], Vol. 22, No. 2, page 111, 1984).

The copper phthalocyanine, however, is still deficient in sensitivity.

Sensitive materials which contain in the sensitive layer thereof titanyl phthalocyanine possessing titanium as a coordination metal like a composite electrophotographic sensitive material which is provided with a sensitive layer having α-type titanyl phthalocyanine dispersed in a binder have been proposed. As examples of such sensitive materials, a composite electrophotographic sensitive material which possesses a sensitive layer having α-type titanyl phthalocyanine dispersed in a binding agent (Japanese Patent Application Disclosure SHO (1986)-239,248) and an electrophotographic sensitive material which has an electric charge transfer layer superposed on an electric charge generating layer having a specific titanyl phthalocyanine dispersed in a binding agent (Japanese Patent Application Disclosure SHO (1987)-67,094) may be mentioned.

The electrophotographic sensitive materials which use as a photoconductive substance titanyl phthalocyanine of the sort described above exhibit appreciably high sensitivity to wavelengths in the aforementioned range of wavelengths inherent in the semiconductor laser and, at the same time, excel in electrical properties including the charging property.

The electrophotographic sensitive materials described above, however, pose as a problem the deficiency in sensitivity as well as in such electrical properties as charging property, dark attenuation, and residual potential.

SUMMARY OF THE INVENTION

An object of this invention is to provide an α-type titanyl phthalocyanine composition which excels not only in sensitivity but also in such electrical properties as charging property, dark attenuation, and residual potential, a method for the production of the composition, and an electrophotographic sensitive material using the composition.

The first aspect of this invention concerns an α-type titanyl phthalocyanine composition which comprises an α-type titanyl phthalocyanine and a metal-free phthalocyanine.

The α-type titanyl phthalocyanine composition enjoys stability, absorbs wavelength distributed in a wide range, and exhibits high spectral sensitivity because it contains an α-type titanyl phthalocyanine in combination with a metal-free phthalocyanine.

The second aspect of this invention concerns a method for the production of an α-type titanyl phthalocyanine composition, which method comprises converting titanyl phthalocyanine into a pigment by the acid paste process consisting in pouring into water a concentrated sulfuric acid solution containing at least titanyl phthalocyanine thereby producing an α-type titanyl phthalocyanine composition comprising a α-type titanyl phthalocyanine and a metal-free phthalocyanine.

In accordance with this method, an α-type titanyl phthalocyanine composition comprising an α-type titanyl phthalocyanine and a metal-free phthalocyanine can be easily produced.

The third aspect of the present invention concerns as electrophotographic sensitive material which has superposed on an electroconductive substrate a sensitive layer comprising an α-type titanyl phthalocyanine and metal-free phthalocyanine.

The fourth aspect of this invention concerns an electrophotographic sensitive material which has superposed on an electroconductive substrate a sensitive layer comprising an α-type titanyl phthalocyanine composition and an electric charge transfer material possessing an oxidation potential in the range of 0.45 to 0.65 eV.

The electrophotographic sensitive material according to the third or fourth aspect of this invention not only excels in charging property and dark attenuation but also exhibits high sensitivity to wavelengths falling in the range of wavelengths inherent in the semiconductor laser and suffers sparingly from residual potential because the phthalocyanines in this sensitive material comprise an α-type titanyl phthalocyanine and a metal-free phthalocyanine.

The α-type titanyl phthalocyanine mentioned above is represented by the following general formula.

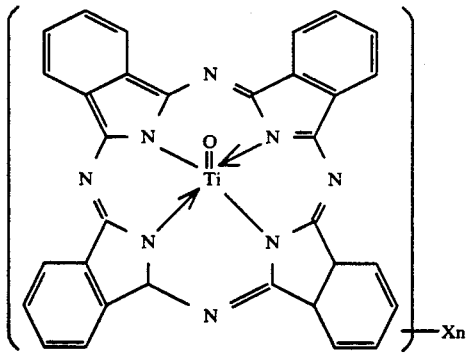

(wherein X stands for a halogen atom and n for 0 or a positive integer of the value of at least 1). As is evident from the above general formula, "titanyl" refers to the divalent radical TiO=.

The halogen atom is desired to be bromine or chlorine and n to be 0.

The α-type titanyl phthalocyanine composition contains a metal-free phthalocyanine in combination with the α-type titanyl phthalocyanine. By jointly containing the α-type titanyl phthalocyanine and a metal-free phthalocyanine, the α-type titanyl phthalocyanine composition is enabled to acquire enhanced stability and excel in charging property and sensitive properties, particularly in sensitivity.

The ratio of the α-type titanyl phthalocyanine to the metal-free phthalocyanine in the α-type titanyl phthalocyanine composition is not particularly restricted but may be varied.

Desirably, the α-type titanyl phthalocyanine composition comprises 40 to 99.5% by weight, preferably 60 to 90% by weight, of an α-type titanyl phthalocyanine and 0.5 to 60% by weight, preferably 10 to 40% by weight, of a metal-free phthalocyanine.

Notwithstanding the metal-free phthalocyanine which is in an instable crystal form is contained, the α-type titanyl phthalocyanine composition of the percentage composition described above excels especially in stability. When it is used as a photoconductive substance for the electrophotographic sensitive material, it manifests outstanding charging property, small dark attenuation, high sensitivity, small residual potential, and highly satisfactory charging property and sensitive property.

If the contents of the o-type titanyl phthalocyanine and the metal-free phthalocyanine deviate from the ranges mentioned above, the α-type titanyl phthalocyanine composition does not easily acquire high sensitivity because the half-value amount of exposure, E ½ ($\mu J/cm^2$), a criterion of sensitivity, in the range of wavelengths inherent in the semiconductor laser increases.

The α-type titanyl phthalocyanine composition possessing the percentage composition specified above exhibits such sensitivity that the half-value amount of exposure, E ½, relative to the semiconductor laser of a wavelength of 780 nm is not more than 0.6 $\mu J/cm^2$.

The α-type titanyl phthalocyanine composition of the aforementioned percentage composition may be produced by mixing in a prescribed ratio an α-type titanyl phthalocyanine and a metal-free phthalocyanine separately prepared in advance.

The α-type titanyl phthalocyanine composition which shows strong diffraction peaks at the Bragg angles ($2\theta \pm 0.2°$) of 6.9°, 9.6°, 15.6°, 17.6°, 21.9°, 23.6°, 24.7°, and 28.0°, the largest diffraction peak at 6.9° among others, in the X-ray diffraction spectrum especially excels in charging property and sensitive property.

Optionally, the α-type titanyl phthalocyanine composition may incorporate therein to an extent incapable of impairing sensitive property and electrical properties including charging property other phthalocyanines such as, for example, copper phthalocyanine, vanadyl phthalocyanine, chloroaluminum phthalocyanine, chloroindium phthalocyanine, chlorogallium phthalocyanine, and magnesium phthalocyanine and titanyl phthalocyanines of other crystal forms.

It may partially incorporate therein β-type, γ-type, δ-type, and ε-type titanyl phthalocyanines.

Though the α-type titanyl phthalocyanine composition need not have been treated, it is desired to have been treated with such surface treating agents as a titanium coupling agent and a silane coupling agent, preferably with a silane coupling agent so as to be improved in stability.

This is because the treatment with the surface treating agent imparts to the α-type titanyl phthalocyanine composition outstanding stability to resist the impacts of aging and the composition, when used as a photoconductive substance for the sensitive layer, exhibits a stable charging property.

Though the amount of the surface treating agent to be used for this treatment may be suitably selected, it is generally in the range of 0.001 to 5% by weight, preferably 0.01 to 1% by weight, based on the amount of the composition to be treated.

The α-type titanyl phthalocyanine composition can be produced by various methods. For example, it can be produced by preparing a titanyl phthalocyanine and converting the titanyl phthalocyanine into a pigment in accordance with the acid paste process consisting in pouring into water a sulfuric acid solution containing at least the titanyl phthalocyanine and optionally incorporating therein a required amount of metal-free phthalocyanine.

The titanyl phthalocyanine may be produced by causing 1,2-dicyanobenzene to react with a titanium halogenide such as titanium tetrachloride, titanium trichloride, or titanium tetrabromide and hydrolyzing the resultant reaction product. Preferably, it is produced by hydrolyzing the titanyl phthalocyanine obtained by the reaction of the following formula:

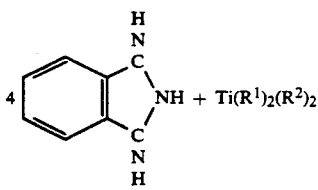

(wherein $R^1$ and $R^2$ independently stand for a lower alkoxy group).

As concrete examples of the lower alkoxy group, there may be mentioned alkoxy groups of 1 to 6 carbon atoms such as methoxy, ethoxy, propoxy, isopropoxy, butoxy, iso-butoxy, tert.-butoxy, pentyloxy, and hexyloxy groups.

The reaction mentioned above is effected by heating 1,3-diiminoisoindolenine and an organic titanium compound in an inactive solvent such as, for example, quinoline; alkylbenzene such as benzene, toluene, or xylene; or trichlorobenzene at a temperature in the range of 100° to 250° C., preferably 150° to 200° C.

After the reaction, the produced titanyl phthalocyanine composition is separated from the reaction mixture by filtration, washed with the reaction solvent mentioned above for removal of impurities and unaltered raw materials, and then optionally washed with alcohol or ether.

The titanyl phthalocyanine composition thus obtained is coarse and nonuniform in crystal form and particle diameter. When used as a sensitive material, it betrays deficiency in charging property and sensitive property and manifests stable properties only with difficulty.

The titanyl phthalocyanine composition obtained by the reaction mentioned above, therefore, is converted into a pigment by the acid paste process. Consequently, there is produced an α-type titanyl phthalocyanine composition comprising an α-type titanyl phthalocyanine and a metal-free phthalocyanine and excelling in charging property and sensitive property.

The pigmentation by the acid paste process is carried out by dissolving the titanyl phthalocyanine in sulfuric acid of a suitable concentration and pouring the resultant solution into water.

The conditions under which the pigmentation by the acid paste process is performed are not particularly restricted but may be freely set so as to suit the properties to be desired.

It is nevertheless desirable to carry out the pigmentation by dissolving the titanyl phthalocyanine in a concentrated sulfuric acid solution and pouring the resultant solution into water at a temperature in the range of −5° to 40° C., more desirably in the range of −5° to 20° C., and most desirably in the neighborhood of 0° C. If the temperature of the water into which the solution is poured is lower than −5° C., the produced composition is deficient in charging property and sensitive property. If this temperature exceeds 40° C., the produced composition possesses insufficient charging property. When the pigmentation is carried out under the conditions mentioned above, an α-type titanyl phthalocyanine composition enjoying highly satisfactory stability and excelling in charging property and sensitive property can be easily produced.

The concentration of the sulfuric acid to be used for the pigmentation may be suitably selected. When sulfuric acid of a high concentration in the range of 92 to 105% (fuming sulfuric acid), desirably 94 to 105%, or more desirably 98 to 100%, is used in an amount not less than 15 times, preferably 15 to 60 times, the amount of titanyl phthalocyanine and the resultant concentrated sulfuric acid solution of titanyl phthalocyanine is heated at a temperature in the range of 0° to 40° C. to effect pigmentation of the titanyl phthalocyanine, the α-type titanyl phthalocyanine composition consequently obtained excels in stability, charging property, and sensitive property in a greater measure.

The range of concentration, 92 to 105%, fixed for the concentrated sulfuric acid is critical because the sensitive property is impaired when the concentration is less than 92% and the charging property is impaired when the concentration exceeds 105%. The lower limit of the amount of the concentrated sulfuric acid is fixed at 15 times the amount of titanyl phthalocyanine because the titanyl phthalocyanine cannot be easily dissolved uniformly when the amount of the concentrated sulfuric acid is less than 15 times that of the titanyl phthalocyanine.

If the temperature at which the concentrated sulfuric acid is treated for the pigmentation is lower than 0° C., the operational efficiency of the pigmentation is inferior due to the inconveniences caused on the part of refrigerating device and facilities. If the temperature exceeds 40° C., the sensitivity is liable to be impaired.

The time for retention of the concentrated sulfuric acid solution at the temperature specified above and the time for purification by the pigmentation may be suitably selected. Generally, the total time required therefor is approximately in the range of 30 minutes to 12 hours.

The pigmentation has the possibility of entailing a reaction tending to expel metal from the reaction system and cause a change in the composition of titanyl phthalocyanine. When this unwanted reaction arises, it is desirable for the sake of more accurate control of the ratio of α-type titanyl phthalocyanine to metal-free phthalocyanine to add to the titanyl phthalocyanine produced in consequence of the reaction of synthesis a prescribed amount of metal-free phthalocyanine and subject the resultant mixture to pigmentation by the aforementioned acid paste process a second time.

The reaction of synthesis mentioned above, depending on the conditions of production, has the possibility of giving rise to a titanyl phthalocyanine containing a metal-free phthalocyanine. To be more specific, when quinoline is used as an inactive solvent, the reaction possibly produces 10 to 20% by weight of a metal-free phthalocyanine. When tetrabutoxy titanium is used as an organic titanium compound and trichlorobenzene or an alkylbenzene is used as an inactive solvent, the reaction possibly produces 0 to 10% by weight of metal-free phthalocyanine. When, in any of such cases, the content of the α-type titanyl phthalocyanine falls within a proper range, the aforementioned repeated pigmentation by the acid paste process may be carried out without requiring the addition of the metal-free phthalocyanine.

Then, for the removal of impurities and residual sulfuric acid, the produced o-type titanyl phthalocyanine composition is separated by filtration, washed, and then dried.

The solvents available for this washing include water and various organic solvents such as alcohols represented by methanol, ethanol, and isopropanol, ethers represented by diethyl ether, dioxane, and tetrahydrofuran, and acetone, dichloromethane, and dimethylformamide, for example.

The washing of the separated α-type titanyl phthalocyanine composition with the solvent mentioned above can be carried out in any suitable manner. For the purpose of enhancing the efficiency of this washing, it is desirable to wash the α-type titanyl phthalocyanine composition as held in a state dispersed in the solvent. Preferably, the composition in the solvent is dispersed and washed by virtue of ultrasonic waves.

The drying of the washed composition may be carried out under normal pressure or under a vacuum at a suitable temperature in the range of 50° to 150° C., for example.

The α-type titanyl phthalocyanine composition produced by the acid paste process described above can be used in its unmodified form as a photoconductive substance for the sensitive material.

For the purpose of adjusting the crystal form, heightening the stability of the α-type titanyl phthalocyanine composition and, at the same time, imparting enhanced sensitivity to the composition, however, it is desirable to subject the α-type titanyl phthalocyanine composition to a treatment with an organic solvent. It is still more desirable for the composition to be subjected to a wet milling treatment in the presence of a chlorine type solvent.

As concrete examples of the aforementioned organic solvent and the chlorine type solvent, there may be cited alcohols such as methanol, ethanol, isopropanol, and butanol; alicyclic hydrocarbons such as n-hexane, octane, and cyclohexane; aromatic hydrocarbons such as benzene, toluene, and xylene; ethers such as tetrahydrofuran, dioxane, diethyl ether, ethylene glycol dimethyl ether, and ethylene glycol diethyl ether; ketones such as acetate cellosolve, acetone, ethylmethyl ketone, and cyclohexanone, isophorone; esters such as methyl acetate and ethyl acetate; non-chlorine type organic solvents dimethyl sulfoxide, dimethylformamide, phenol, cresol, anisole, nitrobenzene, acetophenone, benzyl alcohol, pyridine, N-methyl pyrrolidone, quinoline, and picoline; and chlorine type solvents such as dichloromethane, dichloroethane, trichloroethane, tetrachloroethane, carbon tetrachloride, chloroform, chloromethyl oxirane, chlorobenzene, and dichlorobenzene.

In the organic solvents and chlorine type solvents mentioned above, isophorone, dichloromethane, chloroform, trichloroethane, and chloromethyloxirane are desirable choices and, among all others enumerated, dichloromethane proves to be particularly desirable because it permits production of a sensitive material of small residual potential.

The organic solvents and the chlorine type solvents mentioned above are used either singly or in the form of a mixture of two or more members.

In the solvents mentioned above, the aromatic compounds are liable to cause dislocation of the crystal form of titanyl phthalocyanine to the β-type and the aliphatic hydrocarbons are liable to facilitate production of an α-type titanyl phthalocyanine deficient in dispersibility.

The treatment with the organic solvent mentioned above is effected by immersing the α-type titanyl phtalocyanine composition in the organic solvent held at normal room temperature and heated to a suitable temperature above the room temperature or by washing the composition with the organic solvent. The time for the treatment with the organic solvent may be suitable selected. The speed of crystallization is variable with the kind of solvent. When this treatment is continued for a long time, it may entail the possibility of causing dislocation of the crystal form to the β-type and imparting insufficient sensitivity to the treated composition. Desirably, this treatment is carried out for a period selected in the range of 10 minutes to 10 hours, depending on the kind of organic solvent to be used.

The wet milling treatment is required only to be capable of exerting mechanical force on the o-type titanyl phthalocyanine composition and consequently causing this composition to be mixed and dispersed. It may be carried out with an attriter or a kneader.

Desirably, it is performed with a ball mill which is capable of imparting highly satisfactory sensitive property and charging properly to the produced α-type titanyl phthalocyanine composition.

Though the time for the wet milling treatment is not particularly restricted, it may be freely selected to suit the properties expected of the produced composition. Generally, the wet milling treatment is continued for a period in the range of 1 to 48 hours.

The characteristic properties manifested by the α-type titanyl phthalocyanine composition during the course of its production through the various steps mentioned above will be described below with reference to the X-ray diffraction spectra illustrated in FIGS. 2A to E.

As illustrated in FIG. 2A, the α-type titanyl phthalocyanine composition obtained by the acid paste process shows diffraction peaks at the Bragg angles ($2\theta \pm 0.2°$) of 6.9°, 23.6°, 24.7°, and 28.0°. The diffraction peak at 6.9° is the largest of all the peaks mentioned above.

When the α-type titanyl phthalocyanine composition produced by the acid paste process is immersed in cyclohexane for five hours, the diffraction peaks at the Bragg angle of 6.9°, 21.9°, 23.6°, 24.7°, and 28.0° are intensified, the diffraction peak at 6.9° C. to the largest extent, as illustrated in FIG. 2B. This intensification of diffraction peaks evinces acceleration of the crystallization of the composition.

When the α-type titanyl phthalocyanine composition obtained by the acid paste process is immersed for one week in dichloromethane, diffraction peaks appear not only at the Bragg angles of 6.9°, 9.0°, 10.0°, 12.9°, 25.0°, and 28.2° but also at 26.0° C., the value characteristic of the β-type crystal as illustrated in FIG. 2C, the diffraction peak at 6.9° being the largest of all the diffraction peaks. The data evince that the composition partially incorporates therein the β-type titanyl phtahlocyanine.

When the α-type titanyl phthalocyanine composition obtained by the acid paste process is treated with a ball mill in the presence of dichloromethane as a chlorine type solvent, it shows strong diffraction peaks at the Bragg angles of 6.9°, 10.6°, 15.6°, 17.6°, 21.9°, 23.6°, 24.7°, and 28.0°, the strongest diffraction peak at 6.9° in all the Bragg angles, as illustrated in FIG. 2D. The α-type titanyl phthalocyanine composition thus produced excels in charging property and sensitive property in a greater measure.

When the wet milling treatment mentioned above is carried out in the presence of a chlorine type solvent, particularly dichloromethane, an α-type titanyl phthalocyanine composition excelling in charge property and sensitive property and enjoying high stability can be produced easily presumably because this treatment does not affect the crystal structure like the treatment with an organic solvent if the treatment is continued for a long time.

When the α-type titanyl phthalocyanine composition obtained by the acid paste process is subjected to a ball milling treatment in the presence of toluene, diffraction peaks appear at the Bragg angles of 9.4°, 10.7°, 13.2°, 15.1°, 20.9°, 23.4°, 26.3°, and 27.2° and the strongest diffraction peak falls on the angle 26.3° characteristic of the β-type crystal, among other Bragg angles as illustrated in FIG. 2E. The product of this treatment is deficient in charge property and sensitive property.

For the α-type titanyl phthalocyanine composition obtained by the process mentioned above to acquire higher stability to resist the impact of aging, it is desired to be given a treatment with a surface treating agent.

Various known surface treating agents can be used for this surface treatment. For example, such titanium coupling agents as isopropyl triisostearoyl titanate, isopropyl tridecylbenzene sulfonyl titanate, tetraisopropylbis (dioctylphosphite) titanate, and tetraoctylbis (ditridecylphosphite) titanate are available.

It is more desirable, however, to use a silane coupling agent than such a titanium coupling agent.

The silane coupling agent to be used can be freely selected to suit the desired stability. As concrete examples of the silane coupling agent, there may be mentioned vinyl silanes such as trichlorovinyl silane, trimethoxyvinyl silane, triethoxyvinyl silane, tri(2-methoxyethyoxy) vinyl silane, 3-acryloxypropyltrimethoxy silane, and 3-methacryloxypropyltrimethoxy silane, acryloxy silane and methacryloxy silane; amino silanes 3-aminopropyltrimethoxy silane, N-2-aminoethyl-3-aminopropyltrimethoxy silane, and 3-ureidopropyltriethoxy silane; chlorosilanes and mercaptosilanes such as 3-chloropropyltrimethoxy silane and trimethoxy-3-mercaptopropyl silane; and epoxy silanes such as 2-(3,4-epoxycyclohexyl)-ethyltrimethoxy silane, 2-(3,4-epoxycyclohexyl)-ethyltriethoxy silane, 3-(2,3-epoxypropoxy)-propyltrimethoxy silane, and 3-(2,3-epoxypropoxy)-propyltriethoxy silane.

Among other silane coupling agents mentioned above, epoxy silane type coupling agents prove to be particularly desirable.

The amount of the surface treating agent to be used may be freely selected to suit the purpose of the surface treatment. Generally, it is in the range of 0.001 to 5% by weight, preferably 0.01 to 1% by weight.

The treatment with the surface treating agent mentioned above is performed by immersing the α-type titanyl phthalocyanine composition in a solution of the surface treating agent of spraying the composition with the solution of the surface treating agent and subsequently drying the wet composition.

Now, an electrophotographic sensitive material using the α-type titanyl phthalocyanine composition described above will be explained.

The electrophotographic sensitive material comprises an electroconductive substrate and a sensitive layer superposed on the electroconductive substrate.

The sensitive material contains the α-type titanyl phthalocyanine composition. To be more specific, the sensitive layer may be a single-layer type sensitive layer composed of the α-type titanyl phthalocyanine composition as an electric charge generating substance, an electric charge transferring substance, a binding resin, and optionally "other materials." Otherwise, the sensitive layer may be a laminated type sensitive layer which comprises an electric charge generating layer containing at least the α-type titanyl phthalocyanine composition and an electric charge transfer layer containing an electric charge transferring substance, a binding resin, etc. and superposed on the electric charge generating layer. In the laminated type sensitive layer, the electric charge transfer layer may be superposed on the electric charge generating layer or vice versa.

When the electric charge generating layer of the laminate type sensitive layer contains an α-type titanyl phthalocyanine composition comprising an α-type titanyl phthalocyanine and metal-free phthalocyanine, particularly comprising 60 to 90% by weight of the α-type titanyl phthalocyanine and 10 to 40% by weight of the metal-free phthalocyanine, the sensitive material using the laminate type sensitive layer exhibits small dark attenuation, high sensitivity, and small residual potential and excels in charging property and sensitive property.

The sensitive material which uses as an electric charge generating material therefore the α-type titanyl phthalocyanine composition treated with the silane coupling agent mentioned above exhibits outstanding stability when it is used repeatedly. This sensitive material, therefore, retains the ability to form images of high quality for a very long period of time.

The electroconductive substrate may be in the form of a sheet or a drum. It may be made of a varying material possessing electroconductivity. Simple metals such as aluminum, aluminum alloys, copper, tin, platinum gold, silver, vanadium, molybdenum, chromium, cadmium, titanium, nickel, palladium, indium, stainless steel, and brass and plastic materials and glass materials having layers of the metals enumerated above, indium oxide, and tin oxide superposed thereon by vacuum deposition may be cited as examples.

Since the α-type titanyl phthalocyanine composition functions as an electric charge generating material, use of some other electric charge generating material is not always necessary. For the purpose of designing the sensitive material so that it will exhibit spectral sensitivity not only in the wavelength zone of the semiconductor laser but also on the shorter wavelength side, the α-type titanyl phthalocyanine composition may be used in combination with other electric charge generating substance. In this case, due consideration should be paid to precluding possible impairment of the sensitive material's charging property and sensitive property.

As examples of the electric charge generating material to be used in addition to the α-type titanyl phthalocyanine composition, there may be cited selenium, selenium-tellurium, amorphous silicon, pyrylium salts, azo type compounds, diazo type compounds, trisazo type compounds, anthanthrone type compounds, dibenzypyrene quinone type compounds, other phythalocyanine type compounds, indigo type compounds, triphenylmethane type compounds, indonthrene type compounds, toluidine type compounds, pyrazoline type compounds, perylene type compounds, and quinacridone type compounds.

These electric charge generating substances may be used either singly or in the form of a mixture of two or more members.

The electric charge transferring material available herein include electron receiving substances possessing such electron receiving groups as nitro group, nitroso group, and cyano group, represented by such fluorenone type compounds as tetracyanoethylene and 2,4,7-trinitro-9-fluorenone; and such nitrated compounds as dinitroanthracene and 2,4,8-trinitrothioxanthone; and electron donating substances represented by such hydrazone type compounds as N,N-diethylaminobenzaldehyde, N,N-diphenyl hydrazone, N-methyl-3-carbazolyl aldehyde, and N,N-diphenyl hydrazone; such oxadiazole type compounds as 2,5-di(4-N,N-dimethylaminophenyl)-1,3,4-oxiadiazole and 2,5-di(4-N,N-diethylaminophenyl)-1,3,4-oxadiazole; such styryl type compounds as 9-(4-diethylaminostyryl)anthracene; such carbazole type compounds as N-ethylcarbazole; such pyrazoline type compounds as 1-phenyl-3-( 4-(diemthylaminophenyl)pyrazoline, 1-phenyl-3-(4-dimethylaminostyryl)-5-(4-dimethylaminophenyl)pyrazoline, and 1-phenyl-3-(4-diethylaminostyryl)-5-(4-diethylaminophenyl)pyrazoline; such oxazole type compounds as 2-(4-diethylaminophenyl)-4-(4-dimethylaminophenyl)-5-(2-chlorophenyl)oxazole; isoxazole type compounds; such thiazole type compounds as 2-(4-diethylaminostyryl)-6-diethylaminobenzothiazole; such nitrogen-containing cyclic compounds as thiadiazole type compounds, imidazole type compounds, pyrazole type compounds, indole type compounds, and triazole type compounds; such condensed polycyclic compounds as anthracene, pyrene, and phenanthrene; poly-N-vinyl carbazole; polyvinyl pyrene, polyvinyl anthracene; and ethyl carbazole formaldehyde resin.

The electric charge transferring substances mentioned above are used either singly or in the form of a mixture of two or more members.

The electric charge transferring material to be used as contemplated in the fourth aspect of this invention is required to possess an oxidation potential in the range of 0.45 to 0.65 eV. The reason for this critical range of oxidation potential is as follows.

In order for the electric charge generated from the electric charge generating material to move in the electrophotographic sensitive material, it is necessary that electric charge should be injected into the electric charge transferring material and the injected electric charge should be allowed to produce a hopping motion between the electric charge transferring molecules. In this connection, the relation between the energy of the generated electric charge and the energy of locus of the electric charge transferring molecules into which the electric charge is injected is significant. When the relation between these two forms of energy is optimized, the efficiency of the injection of the generated electric charge into the electric charge transferring material is improved so much as to permit importation of high sensitivity to the sensitive material. When the electric charge generating material is an α-type titanyl phthalocyanine composition and the electric charge transferring material to be used is of a type possessing an oxidation potential in the range of 0.45 to 0.65 eV, the combination of these two materials gives rise to the highest sensitivity in the produced sensitive material.

As examples of the electric charge transferring material possessing an oxidation potential in the range of 0.45 to 0.65 eV, the compounds of the following formulas may be cited.

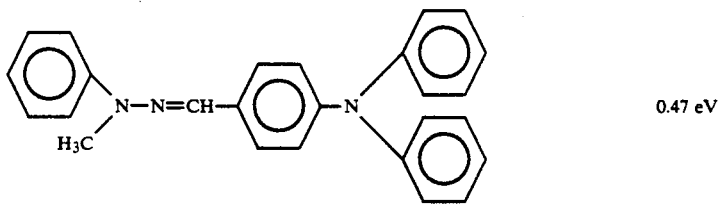

0.47 eV

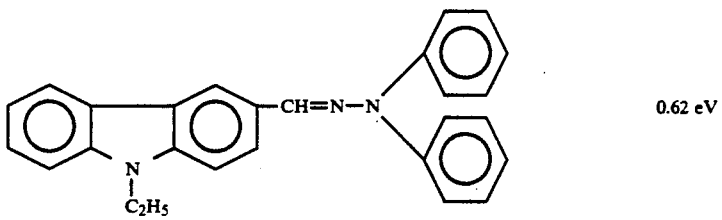

0.62 eV

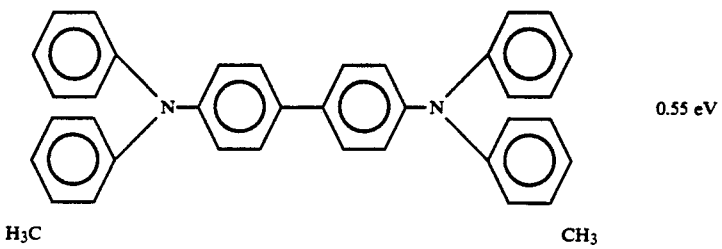

0.55 eV

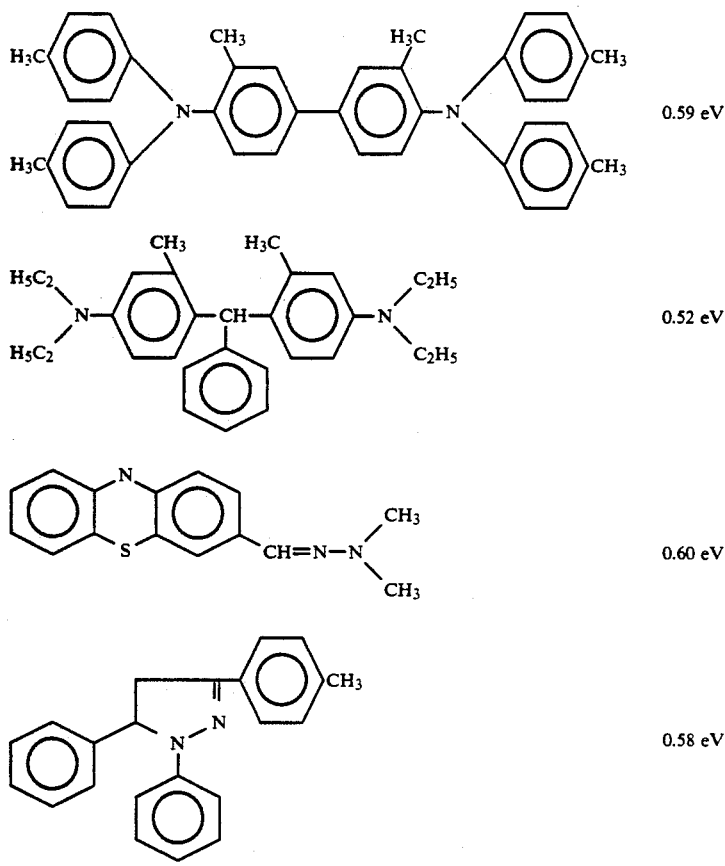

0.59 eV 0.52 eV 0.60 eV 0.58 eV

The term "oxidation potential" mentioned above is to be determined herein by the use of a cyclic voltammetry (reference electrode Ag/Ag+electrode).

As the binding resin, various resins are available. As examples of the binding resin, there may be cited styrene type polymers, styrene-butadiene copolymers, styrene-acrylonitrile copolymers, styrene-maleic acid copolymers, acryl type polymers, styrene-acryl type copolymers, ethylene-vinyl acetate copolymers, polyvinyl chloride, vinyl chloride-vinyl acetate copolymers, polyesters, alkyd resins, polyamides, polyurethanes, acrylmodified urethane resins, epoxy resins, polycarbonates, polyallylates, polysulfones, diallylphthalate resins, silicone resins, ketone resins, polyvinyl butyral resins, polyether resins, and phenyl resins. In addition, such light-setting type resins as epoxy acrylates and urethane acrylates are available. Such photoconductive polymers as poly-N-vinyl carbazole which are useful as electric charge transferring substances are also available as binding resins.

As concrete examples of "other material," such heretofore known sensitizers as terphenyl, halonaphthoquinones, and acenaphthylene; such fluorene type compounds as 9-(N,N-diphenylhydrazino)fluorene and 9-carbazolyliminofluorene; plasticizers; such degradation-proofing agent as antioxidants and ultraviolet absorbents; and various other additives may be mentioned.

The proportions of the α-type titanyl phthalocyanine composition, the electric charge transferring substance, and the binding resin in the single-layer type sensitive layer can be freely selected to suit the particular properties expected of the desired sensitive material. Typically, the α-type titanyl phthalocyanine composition is used in an amount in the range of 2 to 25 parts by weight, preferably 3 to 15 parts by weight, and the electric charge transferring substance in the range of 25 to 200 parts by weight, preferably 50 to 150 parts by weight, based on 100 parts by weight of the binding resin. If the amounts of the α-type titanyl phthalocyanine and the electric charge transferring substance are smaller than their respective lower limits mentioned above, the sensitive material suffers from insufficient sensitivity and unduly large residual potential. If these amounts exceed the upper limits mentioned above, the sensitive material is deficient in surface potential. The single layer type sensitive layer is desired to have a thickness in the range of 3 to 50 μm, preferably 5 to 20 μm.

The electric charge generating layer in the laminate-type sensitive layer is formed by vacuum depositing spattering the α-type titanyl phthalocyanine composition at a temperature not exceeding 200° C. while repressing dislocation of crystal structure. During the course of this formation, it is desirable to use a binding resin for the purpose of keeping the crystal structure from alteration and, moreover, heightening the productivity of the operation.

When the electric charge generating layer in the laminate-type sensitive layer is to be formed by the use of a binding resin, the ratio of the α-type titanyl phthalocyanine composition to the binding resin may be suitably selected. Generally, the α-type titanyl phthalocyanine composition is desired to be used in an amount in the range of 5 to 5,000 parts by weight, preferably 10 to 2,500 parts by weight, based on 100 parts by weight of the binding resin. It the amount of the α-type titanyl phthalocyanine composition is less than 5 parts by weight, the electric charge generating layer is deficient in capacity for generation of electric charge. If this amount exceeds 5,000 parts by weight, there arises a disadvantage that the fastness of adhesion of the sensitive layer to the electroconductive substrate is not sufficient. The electric charge generating layer is desired to have a thickness in the range of 0.01 to 30 μm, preferably 0.1 to 20 μm.

In the formation of the electric charge transfer layer of the laminate-type sensitive layer, the ratio of the electric charge transferring material to the binding resin is desired to be such that the amount of the electric charge transferring material falls in the range of 10 to 500 parts by weight, preferably 25 to 200 parts by weight, based on 100 parts by weight of the binding resin. This range is critical because the electric charge transfer layer is deficient in capacity for transferring electric charge if the amount of the electric charge transferring material is less than 10 parts by weight or the electric charge transfer layer suffers from poor mechanical strength if the amount exceeds 5,000 parts by weight.

The electric charge transfer layer is desired to have a thickness approximately in the range of 2 to 100 μm, preferably 5 to 30 μm.

The single-layer type sensitive layer can be formed by preparing a dispersion containing an α-type titanyl phthalocyanine composition, an electric charge transferring substance, and a binding resin, as a raw material for a sensitive layer, applying this dispersion on an electroconductive substrate, and drying the applied layer of the dispersion.

The laminate-type sensitive layer can be formed by separately preparing a dispersion containing an α-type titanyl phthalocyanine composition and a binding resin and a coating liquid containing an electric charge transferring substance, a binding resin, etc., the dispersion as a raw material for an electric charge generating layer and the coating liquid as a raw material for an electric charge transfer layer, applying the dispersion and the coating liquid sequentially on an electroconductive substrate, and drying the applied layers.

In the preparation of the dispersion and the coating liquid (hereinafter referred to collectively as "dispersions"), organic solvents selected to suit the particular kinds of binding resin, etc. are used. Alcohols such as methanol, ethanol, propanol, isopropanol, and butanol; aliphatic hydrocarbons such as n-hexane, octane, and cyclohexane; aromatic hydrocarbons such as benzene, toluene, an xylene; halogenated hydrocarbons such as dichloromethane, dichloroethane, carbon tetrachloride, and chlorobenzene; ethers such as dimethyl ether, diethyl ether, tetrahydrofuran, ethylene glycol dimethyl ether, and ethylene glycol diethyl ether; ketones such as acetone, methylethyl ketone, and cyclohexanone; esters such as ethyl acetate and methyl acetate; and dimethyl formamide and dimethyl sulfoxide may be cited as examples of the organic solvent usable for the preparation.

These organic solvents are used either singly or in the form of a mixture of two or more members.

The dispersions may incorporate therein a surfactant and a leveling agent such as silicone oil for the purpose of improving the dispersibility of the α-type titanyl phthalocyanine composition and other components and the coating property of the dispersions.

The dispersions can be prepared by any of the conventional methods popularly used for mixing and dispersing given materials, using a mixer, a ball mill, a paint shaker, a sand mill, an attriter, or an ultrasonic dispersion device, for example. The application of the dispersions is attained by any of the conventional coating methods in popular use such as, for example, dip coating, spray coating, spin coating, roller coating, blade coating, curtain coating, and bar coating methods.

The electrophotographic sensitive material is obtained by applying the dispersion, for example, to the electroconductive substrate and subsequently drying the applied layer.

The conditions for the drying may be fixed so as to suit the particular kinds of solvents to be used. For the sake of preventing the electric charge transferring substance from degradation, the drying is generally carried out at a temperature in the range of 50° to 300° C. for a period in the range of 30 minutes to 24 hours.

For the purpose of enhancing the fastness of mutual adhesion between the electroconductive substrate and the sensitive layer, an undercoating layer may be interposed therebetween. The undercoating layer is formed by applying on the given surface a solution of natural or synthetic macromolecular substance in an amount calculated to produce a dry layer approximately 0.01 to 1 μm in thickness.

For the protection of the sensitive layer, a surface protecting layer may be superposed on the sensitive layer. The surface protecting layer is formed by preparing a liquid mixture consisting of at least a binding resin, at least an agent for preventing the binding resin from degradation, and other additives and applying the mixture on a given surface in an amount calculated to produce a dry layer of a thickness generally in the range of 0.1 to 10 μm, preferably 0.2 to 5 μm.

The electrophotographic sensitive material described above excels in sensitivity as well as in such electrical properties as charging property, dark attenuation, and residual potential because the sensitive layer thereof contains the α-type titanyl phthalocyanine composition. The electrophotographic sensitive material, therefore, is useful as an organic sensitive material not merely in the laser beam printer but equally in such image forming devices as the copying machine and the facsimile.

DETAILED DESCRIPTION OF THE EMBODIMENTS

Figure 1:
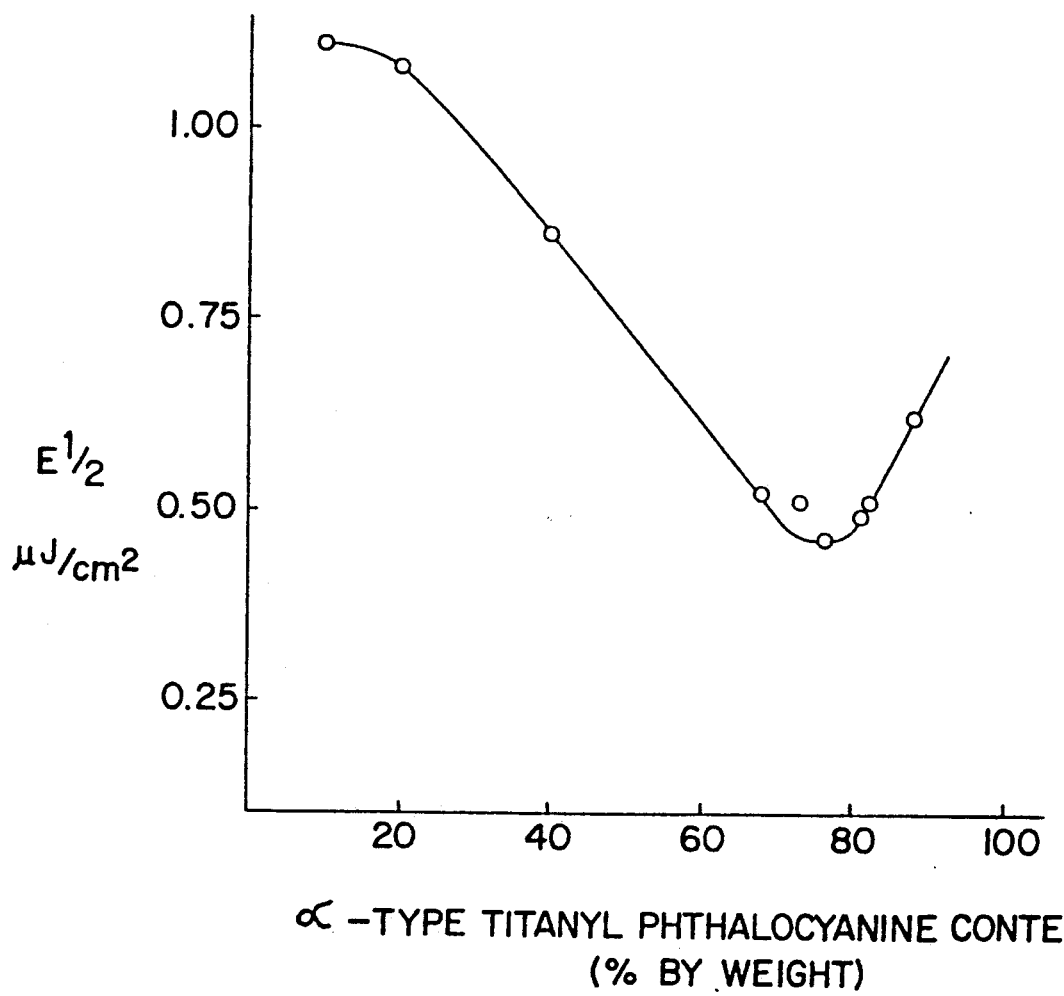
FIG. 1 is a diagram showing the relation between the α-type titanyl phthalocyanine content in the α-type titanyl phthalocyanine composition and the sensitivity of the composition in Examples 1 to 9.
Figure 2A:
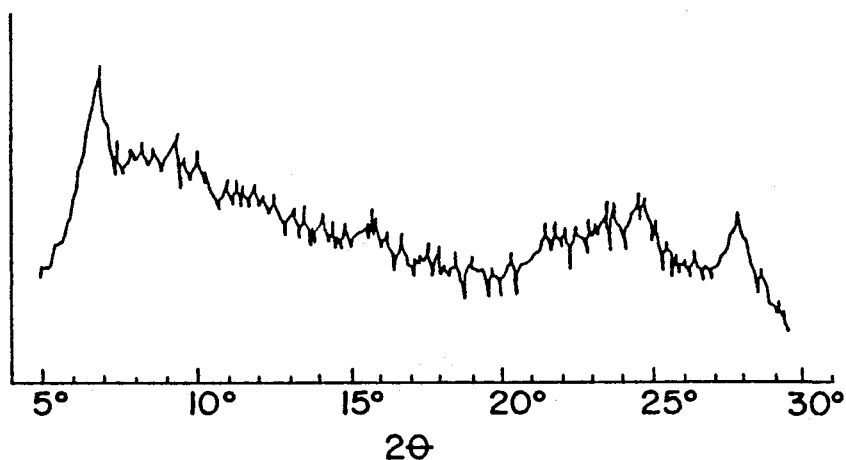
FIGS. 2(A) to 2(E) represent X-ray diffraction spectra: Part A showing an X-ray diffraction spectrum of an α-type titanyl phthalocyanine composition obtained by the process of sulfuric acid purification, Part B an X-ray diffraction spectrum of an α-type titanyl phthalocyanine composition obtained by the process of sulfuric acid purification and subsequently immersed in cyclohexanone, and Part C an X-ray diffraction spectrum of an α-type titanyl phthalocyanine composition obtained by the process of sulfuric acid purification and subsequently immersed in dichloromethane, Part D an X-ray diffraction spectrum of an α-type titanyl phthalocyanine composition obtained by the process of sulfuric acid purification and subsequently treated in a ball mill in the presence of dichloromethane, and Part E an X-ray diffraction spectrum of an α-type titanyl phthalocyanine composition obtained by the process of sulfuric acid purification and subsequently treated in a ball mill in the presence of toluene.
Figure 2B:
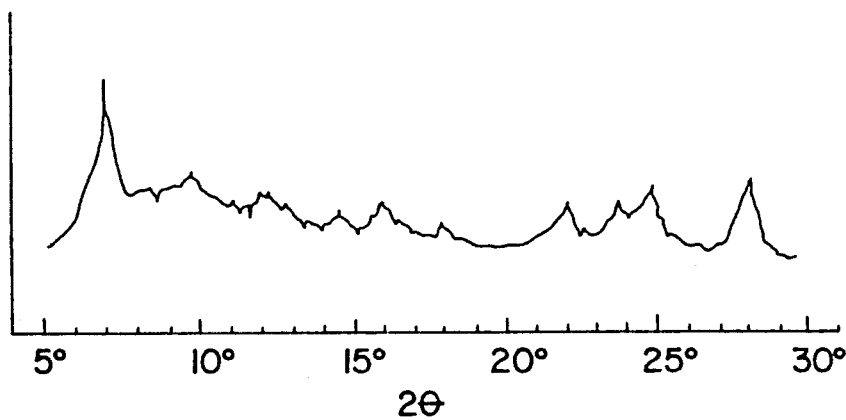
Figure 2C:
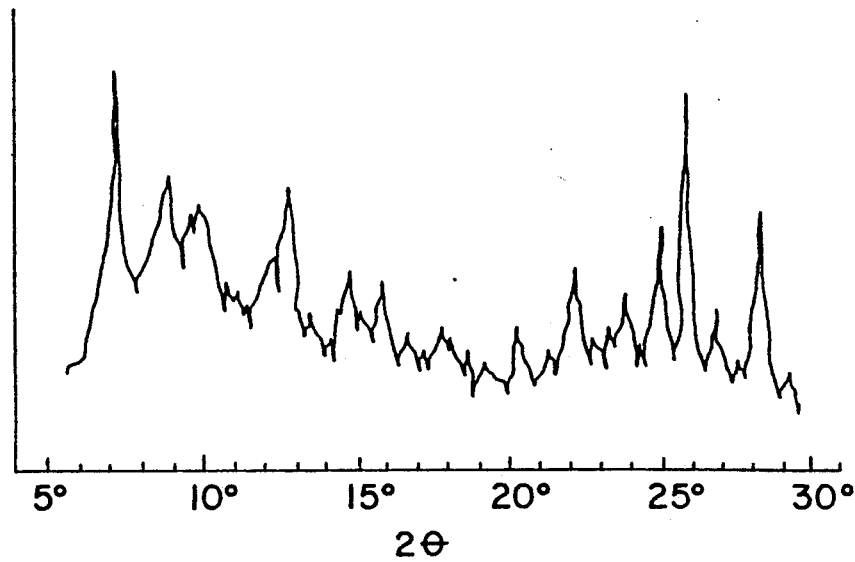
Figure 2D:
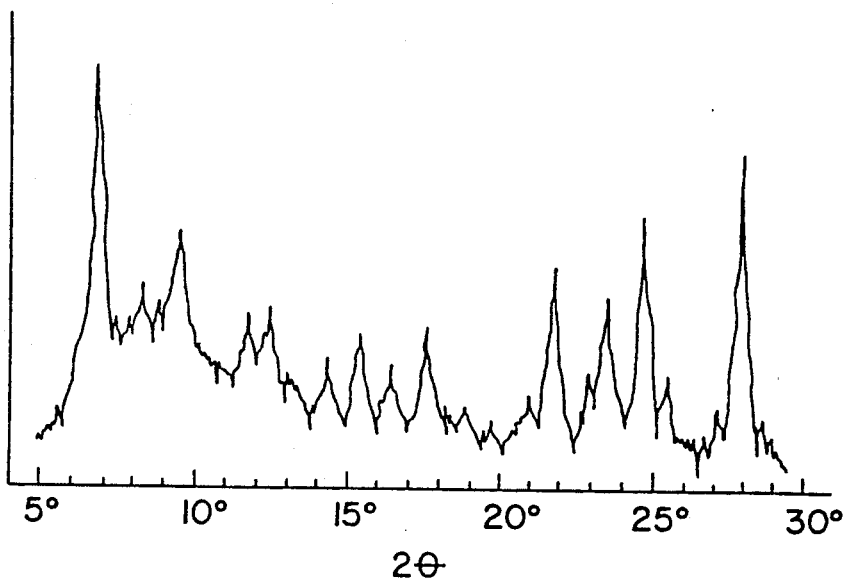
Figure 2E:
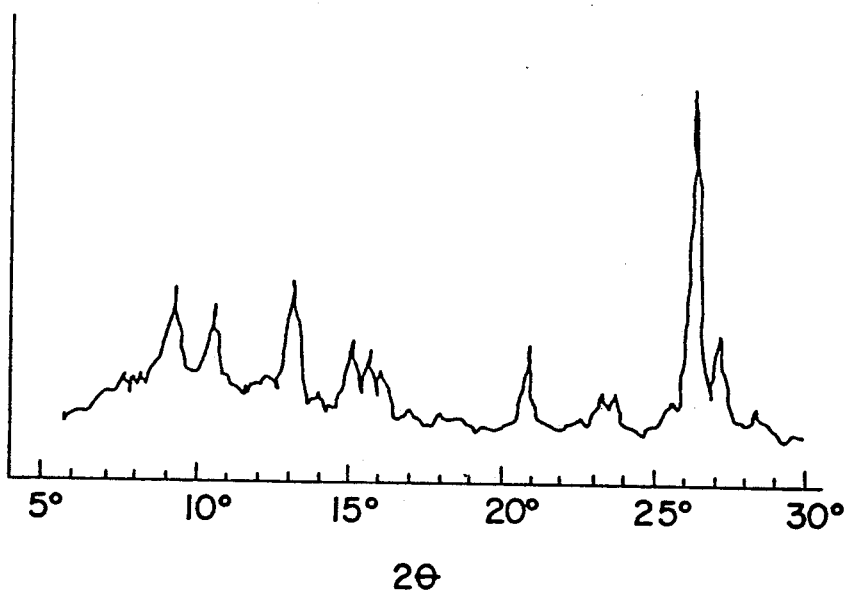

Now, the present invention will be described more specifically below with reference to working examples.

Synthesis 1

Titanyl phthalocyanine was synthesized by placing 4 mols of 1,3-diiminoisoindolenine, 1 mol of diisopropoxybis(1-acetyl-2-propoxy) titanium, and a prescribed amount of an alkylbenzene in a reaction vessel and heating them for reaction at a temperature of 170° to 180° C. for five hours.

Synthesis 2

Titanyl phthalocyanine wa synthesized by placing 4 mols of 1,3-diiminoisoindolenine, 1 mol of tetrabutoxy titanium, and a prescribed amount of quinoline in a reaction vessel and heating them for reaction at temperature of 170° to 180° C. for five hours.

EXAMPLE 1

In 1,500 parts by weight of concentrated sulfuric acid having a concentration of 98%, 100 parts by weight of the titanyl phthalocyanine synthesized in Synthesis 1 was dissolved and left standing at a temperature of 25° C. for three hours. The resultant solution was poured in a large volume of water at 0° C. to cause precipitation of an α-type titanyl phthalocyanine composition. Then, the α-type titanyl phthalocyanine composition was separated by filtration and then washed by being dispersed in dichloromethane.

The separation by filtration and the washing were repeated. The finally washed α-type titanyl phthalocyanine composition was dried at a temperature of 80° C., to produce an α-type titanyl phthalocyanine composition.

In a ball mill, the produced α-type titanyl phthalocyanine composition and a prescribed amount of dichloromethane were mixed for 20 hours, to produce an α-type titanyl phthalocyanine composition.

The α-type titanyl phthalocyanine composition thus produced was found to contain about 82.3% by weight of α-type titanyl phthalocyanine.

FIG. 2 A shows an X-ray diffraction spectrum of the spectrum of the α-type titanyl phthalocyanine composition obtained as described above.

A dispersion as a raw material for an electric charge generating layer was prepared by dispersing and mixing 100 parts by weight of the α-type titanyl phthalocyanine composition obtained above, 100 parts by weight of a vinyl chloride-vinyl acetate copolymer (produced by Sekisui Chemical Co., Ltd. and marketed under trademark designation of "S-lec C"), 300 parts by weight of dichloromethane, and 200 parts by weight of tetrahydrofuran with the aid of ultrasonic waves.

A solution as a raw material for an electric charge transfer layer was prepared from 70 parts by weight of 4-diethylaminobenzaldehyde-N,N-diphenylhydrazone, 100 parts by weight of a bisphenol Z type polycarbonate (produced by Mitsubishi Gas Chemical Industries Ltd. and marketed under product code of "Z-300"), and 500 parts by weight of benzene.

Then, an electric charge generating layer not more than 1 μm in thickness was formed by applying the dispersion for electric charge generating layer and drying the applied layer of the dispersion at a temperature of 100° C. for one hour. On the electric charge generating layer, an electric charge transfer layer about 15 μm in thickness was formed by applying thereon the solution for electric charge transfer layer and drying the applied layer of the solution at a temperature of 100° C. for one hour. Thus, an electrophotographic sensitive material was completed.

EXAMPLES 2 to 9

α-type titanyl phthalocyanine compositions having smaller α-type titanyl phthalocyanine contents than the composition of Synthesis 1 were produced by adding prescribed amounts of metal-free phthalocyanine to the α-type titanyl phthalocyanine composition synthesized in Synthesis 1 (Examples 2 to 8).

An α-type titanyl phthalocyanine composition containing 88.1% of an α-type titanyl phthalocyanine was produced by treating the titanyl phthalocyanine of Synthesis 2 by following the procedure of Example 1 (Example 9).

As described above, eight α-type titanyl phthalocyanine compositions having different α-type titanyl phthalocyanine contents were produced.

From these α-type titanyl phthalocyanine compositions, electrophotographic sensitive materials were produced by following the procedure of Example 1.

To test the electrophotographic sensitive materials produced in Examples 1 to 9 for charging property and sensitive property, they were negatively charged by corona discharge generated under the condition of $-6.0$ KV with an electrostatic test copier (produced by GENTEC Corp. and marketed under trademark designation of "GENTEC CYNTHIA 30M") and evaluated in surface potential, V s.p. (V), and inflow current, I p (μA).

The electrophotographic sensitive materials were exposed to a semiconductor laser beam of a wavelength of 780 nm and left standing until their values of surface potential, V s.p., decreased to $\frac{1}{2}$ while clocking the time of this standing to permit calculation of the half-value amount of exposure, E $\frac{1}{2}$ (μJ/cm$^2$). The surface potentials of the compositions were measured after elapse of 0.15 second following the exposure and reported as their residual potentials, Vr. p. (V).

The results of the test of the electrophotographic sensitive materials obtained in the examples for charging property and sensitive property are shown in Table 1. The relation between the α-type titanyl phthalocyanine content of α-type titanyl phthalocyanine composition and the half-value amount of exposure as a criterion of the sensitivity of the composition is shown in FIG. 1.

The α-type titanyl phthalocyanine content of the α-type titanyl phthalocyanine composition indicated in this diagram was obtained from a calibration curve drawn on the basis of the absorption wave frequency (870 cm$^{-1}$) inherent in α-type titanyl phthalocyanine in the infrared absorption spectrum and the absorption wave frequency (890 cm$^{-1}$) inherent in metal-free phthalocyanine.

TABLE 1

|  | TiOPc content* (% by weight) | Vs. p. (V) | Vr. p. (V) | Ip (μA) | E $\frac{1}{2}$ (μJ/cm$^2$) |
|---|---|---|---|---|---|
| Example 1 | 82.3 | −660 | −102 | −85 | 0.51 |
| Example 2 | 10 | −615 | −215 | −130 | 1.11 |
| Example 3 | 20 | −670 | −209 | −75 | 1.08 |
| Example 4 | 40 | −640 | −174 | −70 | 0.86 |

TABLE 1-continued

|  | TiOPc content* (% by weight) | Vs. p. (V) | Vr. p. (V) | Ip (μA) | E ½ (μJ/cm²) |
| --- | --- | --- | --- | --- | --- |
| Example 5 | 68.0 | −650 | −103 | −70 | 0.52 |
| Example 6 | 73.2 | −640 | −98 | −70 | 0.51 |
| Example 7 | 76.3 | −630 | −96 | −65 | 0.46 |
| Example 8 | 81.3 | −650 | −99 | −65 | 0.49 |
| Example 9 | 88.1 | −630 | −112 | −85 | 0.62 |

*TiOPc: Acronym for α-type titanyl phthalocyanine.

It is clearly noted from Table 1 and FIG. 1 that the sensitive materials using α-type titanyl phthalocyanine compositions comprising an α-type titanyl phthalocyanine and a metal-free phthalocyanine excelled in charging property, manifested sparing residual potential, and enjoyed high sensitivity. Particularly, the sensitive materials using α-type titanyl phthalocyanine compositions having α-type titanyl phthalocyanine contents in the range of 40 to 99.5% by weight exhibited high sensitivity. Especially, the sensitive materials using α-type titanyl phthalocyanine compositions having α-type titanyl phthalocyanine contents in the range of 60 to 90% by weight possessed exceptionally high levels of sensitivity as evinced by their half-value amounts of exposure not exceeding 0.6 μJ/cm².

EXAMPLES 10 to 13

A concentrated sulfuric acid solution of titanyl phthalocyanine was obtained by dissolving 100 parts by weight of the titanyl synthetized in Synthesis 1 in 1,500 parts by weight of concentrated sulfuric acid of a concentration of 98% and then allowing the resultant solution to stand at a temperature of 25° C. for three hours. The aliquots of the concentrated sulfuric acid solution were severally poured into large volumes of water kept at −5° C. (Example 10), 18° C. (Example 11), 40° C. (Example 12), and 70° C. (Example 13) to induce precipitation of α-type titanyl phthalocyanine compositions.

Four electrophotographic sensitive materials were prepared from the α-type titanyl phthalocyanine compositions obtained as described above by following the procedure of Example 1. They were tested for properties by following the procedure of Examples 2 to 9. Table 2 shows the results of the test.

For comparison, the data obtained in Example 1, i.e. an experiment in which the concentrated sulfuric acid solution containing an α-type titanyl phthalocyanine composition was poured into water at 0° C., are additionally shown in the table.

TABLE 2

|  | Temperature of water (°C.) | Vs. p. (V) | Vr. p. (V) | Ip (μA) | E ½ (μJ/cm²) |
| --- | --- | --- | --- | --- | --- |
| Example 10 | −5 | −650 | −99 | −90 | 0.51 |
| Example 1 | 0 | −660 | −102 | −85 | 0.51 |
| Example 11 | 18 | −653 | −94 | −88 | 0.49 |
| Example 12 | 40 | −653 | −106 | −93 | 0.53 |
| Example 13 | 70 | −645 | −139 | −124 | 0.74 |

It is clearly noted from Table 2 that the electrophotographic sensitive materials of Examples 10 to 13, particularly those of Examples 10 to 12, i.e. the experiments in which concentrated sulfuric acid solutions of α-type titanyl phthalocyanine compositions were poured into water at temperature in the range of −5° to 40° C., invariably excelled in charging property and sensitive property.

EXAMPLES 14 to 19

α-type titanyl phthalocyanine compositions were produced by following the procedure of Example 1, excepting concentrated sulfuric acids of concentrations of 82% (Example 14), 90% (Example 15), 94% (Example 16), 96% (Example 17), 100% (Example 18), and 105% (Example 19) were used in the place of the concentrated sulfuric acid of a concentration of 98% and the titanyl phthalocyanine composition synthesized in Synthesis was used instead.

From these α-type titanyl phthalocyanine compositions, electrophotographic sensitive materials were produced by following the procedure of Example 1 They were tested for charge property and sensitive property by following the procedure of Examples 1 to 9. Table 3 shows the results of the test.

TABLE 3

|  | Concentration of sulfuric acid (%) | Vs. p. (V) | Vr. p. (V) | Ip (μA) | E ½ (μJ/cm²) |
| --- | --- | --- | --- | --- | --- |
| Example 14 | 82 | −430 | −159 | −100 | 1.29 |
| Example 15 | 90 | −530 | −172 | −100 | 1.34 |
| Example 16 | 94 | −630 | −123 | −100 | 0.72 |
| Example 17 | 96 | −670 | −107 | −100 | 0.59 |
| Example 1 | 98 | −660 | −102 | −85 | 0.51 |
| Example 18 | 100 | −660 | −94 | −100 | 0.47 |
| Example 19 | 105 | −600 | −92 | −170 | 0.40 |

It is clearly noted from Table 3 that the electrophotographic sensitive materials of Examples 14 to 19, particularly those of Examples 16 to 19 using sulfuric acids of concentrations in the range of 94 to 105%, excelled in charging property and sensitive property.

EXAMPLE 20

An α-type titanyl phthalocyanine composition was prepared by following the procedure of Examples 14 to 19, excepting 100 parts by weight of the titanyl phthalocyanine synthesized in Synthesis 1 was dissolved in 6,000 parts by weight of a concentrated sulfuric acid of a concentration of 98%. From this α-type titanyl phthalocyanine composition, an electrophotographic sensitive material was produced. The electrophotographic sensitive material was tested for properties by following the procedure of Example 1. Table 4 shows the results of the test. The properties of the electrophotographic sensitive materials produced in Example 1 are shown additionally in the same table.

TABLE 4

|  | Vs. p. | Vr. p. | Ip | E ½ |
| --- | --- | --- | --- | --- |
| Example 20 | −525 | −112 | −180 | 0.61 |
| Example 1 | −660 | −102 | −65 | 0.51 |

It is clearly noted from Table 4 that the electropotographic sensitive material of Example 20 showed satisfactory properties but relatively low charging property.

EXAMPLE 21

The α-type titanyl phthalocyanine composition obtained in Example 9 was treated with 2-(3,4-epoxycyclohexyl)ethyltrimethoxy silane, an epoxy silane type silane coupling agent, to produce an α-type titanyl phthalocyanine composition having an amount of treatment of about 0.03% by weight.

From the α-type titanyl phthalocyanine composition thus obtained, an electrophotographic sensitive material was produced by following the procedure of Example 1.

The electrophotographic sensitive material was evaluated for properties before and after 200 cycles of charging and exposure. Table 5 shows the results of the test.

The properties similarly obtained of the electrophotographic sensitive material of Example 9 are additionally shown in the same table.

TABLE 5

|  |  | Vs. p. | Vr. p. | Ip | E ½ |
|---|---|---|---|---|---|
| Example 21 | Before | −620 | −107 | −85 | 0.58 |
|  | After | −615 | −101 | −85 | 0.58 |
|  | Difference | −5 | −6 | 0 | 0 |
| Example 9 | Before | −630 | −112 | −85 | 0.62 |
|  | After | −570 | −119 | −85 | 0.60 |
|  | Difference | −60 | −4 | 0 | 0.02 |

It is clearly noted from Table 5 that the electrophotographic sensitive material of Example 21 using the α-type titanyl phthalocyanine composition treated with a silane coupling agent excelled in repeating property and exhibited stable charging property and sensitive property.

EXAMPLE 22

An α-type titanyl phthalocyanine composition purified with sulfuric acid was prepared by adding a prescribed amount of metal-free phthalocyanine synthesized in synthesis 1, treating the resultant mixture in the same manner as in Example 1 thereby forming a concentrated sulfuric acid solution of titanyl phthalocyanine, and pouring the solution into water at a temperature of 0° C. Then, this α-type titanyl phthalocyanine was kept immersed in cyclohexanone for five hours, to produce an α-type titanyl phthalocyanine composition containing 76.3% by weight of α-type titanyl phthalocyanine.

From the α-type titanyl phthalocyanine composition thus obtained, an electrophotographic sensitive material was produced by following the procedure of Example 1.

EXAMPLES 23 and 24

Two aliquots of the α-type titanyl phthalocyanine composition obtained as purified with sulfuric acid in Example 22 were kept immersed for five hours (Example and one week (Example 25) in dichloromethane, to produce α-type titanyl phthalocyanine composition.

Then, from the α-type titanyl phthalocyanine compositions thus obtained, electrophotographic sensitive materials were produced by following the procedure of Example 1.

EXAMPLE 25

The α-type titanyl phthalocyanine composition obtained as purified with sulfuric acid in Example 22 was mixed and dispersed in a ball mill for 24 hours in the presence of dichloromethane, to produce an α-type titanyl phthalocyanine composition.

From the α-type titanyl phthalocyanine composition thus obtained, an electrophotographic sensitive material was produced by following the procedure of Example 1.

COMPARATIVE EXPERIMENT 1

The α-type titanyl phthalocyanine obtained as purified with sulfuric acid in Example 22 was mixed and dispersed in a ball mill for 24 hours in the presence of toluene, to produce a β-type titanyl phthalocyanine composition.

Then, from the β-type titanyl phthalocyanine composition, an electrophotographic sensitive material was produced by following the procedure of Example 1.

The electrophotographic sensitive materials of Examples 22 to 25 and Comparative Experiment 1 were evaluated for properties by following the procedure of Example 1. The results of the test were as shown in Table 6 below.

TABLE 6

|  | Treating condition | Vs. p. (V) | Vr. p. (V) | Ip (μA) | E ½ (μJ/cm²) |
|---|---|---|---|---|---|
| Example 22 | Immersion in CHN | −635 | −126 | −53 | 0.53 |
| Example 23 | Immersion in DCM | −630 | −113 | −60 | 0.66 |
| Example 24 | Immersion in DCM | −620 | −115 | −85 | 0.65 |
| Example 25 | Ball mill in DCM | −615 | −97 | −95 | 0.45 |
| Comparative Experiment 1 | Ball mill in T | −600 | −173 | −150 | 0.95 |

CHN: Cyclohexanone, DCM: dichloromethane, T: toluene

It is clearly noted from Table 6 that the electrophotographic sensitive materials of Examples 22 to 25 invariably excelled in charging property and sensitive property despite partial inclusion of β-type titanyl phthalocyanine and particularly the electrophotographic sensitive material of Example 25 which had been treated by ball milling in the presence of dichloromethane exhibited particularly high sensitivity. In contrast, the electrophotographic sensitive material of Comparative Experiment 1 using a β-type titanyl phthalocyanine possessed high residual potential and exhibited no sufficient sensitivity.

The X-ray diffraction spectra of titanyl phthalocyanine's of Examples 22, 24, and 25 and Comparative Experiment 1 are shown respectively in FIG. 2 B, C, D, and E.

From these diagrams, it is clearly noted that the α-type titanyl phthalocyanine composition (B) which had undergone immersion in cyclohexanone showed a sign of accelerated crystallization, the α-type titanyl phthalocyanine composition (C) which had undergone immersion in dichloromethane showed a sign of partial inclusion of β-type titanyl phthalocyanine, the α-type titanyl phthalocyanine composition (D) which had been treated by ball milling in the presence of dichloromethane clearly showed diffraction peaks peculiar to α-type titanyl phthalocyanine, and the α-type titanyl phthalocyanine composition (E) which had undergone treatment in a ball mill in the presence of toluene identified itself to be a β-type crystal.

EXAMPLES 26 and 27 and COMPARATIVE EXPERIMENTS 2 and 3

A solution consisting of 100 parts by weight of the titanyl phthalocyanine synthesized in synthesis 2 and 1,500 parts by weight of concentrated sulfuric acid of a concentration of 98% was left standing at a temperature of 25° C. for three hours. Then, this solution was poured into a large volume of water at 0° C. to produce a slurry containing an α-type titanyl phthalocyanine composition. From this slurry, the α-type titanyl phthalocyanine composition was separated by filtration. The separated composition was washed by being dispersed in dichloromethane. The separation by filtration and the washing were repeated several times and the finally washed composition was dried at a temperature of 80° C., to produce an α-type titanyl phthalocyanine composition.

In a ball mill, the α-type titanyl phthalocyanine composition and a prescribed amount of dichloromethane were mixed for 20 hours to produce an α-type titanyl phthalocyanine composition.

The α-type titanyl phthalocyanine composition thus obtained was found to contain about 82.3% by weight of an α-type titanyl phthalocyanine.

A dispersion was prepared from 8 parts by weight of the α-type titanyl phthalocyanine composition of the percentage composition mentioned above, 100 parts by weight of a bisphenol Z type polycarbonate (produced by Mitsubishi Gas Chemical Industries Ltd.), 100 parts by weight of a varying electric charge transferring material indicated in Table 7, and 1,000 parts by weight of tetrahydrofuran with the aid of an ultrasonic wave dispersing device. This dispersion was applied on an aluminum sheet to produce an electrophotographic sensitive material provided with a sensitive layer about 20 μm in thickness.

The electrophotographic sensitive materials obtained in Examples 26 and 27 and Comparative Experiments 2 and 3 were positively charged with an electrostatic test copier (produced by GENTEK Corp. and marketed under trademark designation of "GENTEK SYNTHIA 30M) and then evaluated with respect to surface potential, V s.p. (V).

The sensitive materials were exposed to a halogen light and left standing until the surface potentials decreased to ½ of the initial values while clocking the time of standing to permit calculation of their half-value amounts, E ½ (μJ/cm$^2$). Their values of surface potential were measured after elapse of 0.15 second following the exposure and reported as residual potentials, V rp (V).

TABLE 7

| | Electric charge transferring material | Oxidation potential |
|---|---|---|
| Example 26 | [structure: Ph(H3C)N—N=CH—C6H4—N(Ph)2] | 0.47 eV |
| Example 27 | [structure: N-ethyl carbazole-CH=N—N(Ph)2] | 0.62 eV |
| Comparative Experiment 2 | [structure: Ph(H3C)N—N=CH—C6H4—N(Ph)(CH3)] | 0.42 eV |
| Comparative Experiment 3 | [structure: N-phenyl carbazole-CH=N—N(Ph)2] | 0.70 eV |

The values of oxidation potential of the electric charge transferring materials indicated in Table 7 were obtained by the measurement with a cyclic voltametry. In this measurement, a platinum electrode was used as an operating electrode, a 0.1-mol acetonitrile Ag/Ag+electrode as a reference electrode, and a platinum electrode as a counter electrode. A dichloromethane solution containing 1 m.mol of a given electric charge transferring material and 0.1 mol of (n-C$_4$H$_9$)$_4$NClO$_4$ as a supporting electrolyte, after being bubbled with argon gas, was tested for oxidation potential at a scanning speed of 100 mV/sec. Table 8 given below shows the results of the test conducted on the electrophotographic sensitive materials for half-value amount of exposure and residual potential.

TABLE 8

| | E ½ (μJ/cm²) | Vrp (V) |
|---|---|---|
| Example 26 | 7.8 | 62 |
| Example 27 | 6.7 | 48 |
| Comparative Experiment 2 | 10.7 | 100 |
| Comparative Experiment 3 | 9.6 | 87 |

It is clearly noted from Table 8 that the electrophotographic sensitive materials of Examples 26 and 27 possessed lower values of residual potential and higher levels of sensitivity than those of Comparative Experiments 2 and 3. The electrophotographic sensitive materials containing electric charge transferring materials exhibiting oxidation potential in the range of 0.45 to 0.65 eV were excellent in sensitivity and low in residual potential.

As described above, the α-type titanyl phthalocyanine composition constituting the first aspect of this invention is stable, wide in range of absorption wavelengths, and large in spectral sensitivity as well because it contains an α-type titanyl phthalocyanine in addition to metal-free phthalocyanine.

The method for the production of an α-type titanyl phthalocyanine composition which constitutes the second aspect of this invention permits easy production of an α-type titanyl phthalocyanine composition stable to withstand the impact of aging because it effects pigmentation of the composition by the acid paste process which consists in pouring a concentrated sulfuric acid solution containing at least titanyl phthalocyanine into cold water.

The electrophotographic sensitive material constituting the third aspect of this invention not only excels in charging property and dark attenuation property but also exhibits high sensitivity and sparing residual potential because the phthalocyanines in the sensitive layer comprise α-type titanyl phthalocyanine and metalfree phthalocyanine.

The electrophotographic sensitive material constituting the fourth aspect of this invention is high in sensitivity and low in residual potential because it uses an α-type titanyl phthalocyanine composition as an electric charge generating material and also using an electric charge transferring material exhibiting oxidation potential in the range of 0.45 to 0.65 eV.

What is claimed is:

1. An α-type titanyl phthalocyanine composition, comprising an α-type titanyl phthalocyanine and a metal-free phthalocyanine.

2. An α-type titanyl phthalocyanine composition according to claim 1, wherein the content of said α-type titanyl phthalocyanine is in the range of 60 to 90% by weight and the content of said metal-free phthalocyanine in the range of 10 to 40% by weight.

3. An α-type titanyl phthalocyanine composition according to claim 1, wherein said α-type titanyl phthalocyanine shows strong diffraction peaks at Bragg angles of 6.9°, 9.6°, 15.6°, 17.6°, 21.9°, 23.6°, 27.7°, and 28.0°, and the strongest diffraction peak at Bragg angle 6.9° in an X-ray diffraction spectrum.

4. An α-type titanyl phthalocyanine composition according to claim 1, wherein said α-type phthalocyanine composition has undergone a surface treatment with a silane coupling agent.

5. A method for the production of an α-type titanyl phthalocyanine composition, comprising converting titanyl phthalocyanine into a pigment by an acid paste process which includes pouring into cold water a concentrated sulfuric acid solution containing at least titanyl phthalocyanine, thereby producing an α-type titanyl phthalocyanine and a metal-free phthalocyanine.

6. A method according to claim 5, wherein the water temperature into which said concentrated sulfuric acid solution is poured is in the range of −5° to 40° C.

7. A method according to claim 6, wherein said concentrated sulfuric acid solution is prepared by using a concentrated sulfuric acid of a concentration in the range of 92 to 105% in an amount not less than 15 times the amount of titanyl phthalocyanine, and said concentrated sulfuric acid solution is kept at a temperature in the range of 0° to 40° C.

8. A method according to claim 5, wherein said α-type phthalocyanine composition is subjected to a wet milling in the presence of a chlorine type solvent, said chlorine type solvent being at least one solvent chosen from the group of: dichloromethane, dichloroethane, trichloroethane, tetrachloroethane, carbon tetrachloride, chloroform, chloromethyl oxirane, chlorobenzene and dichlorobenzene.

9. A method according to claim 5, further comprising surface treating said α-type titanyl phthalocyanine composition with a silane coupling agent.

10. A method according to claim 9, wherein said silane coupling agent is an epoxy type silane coupling agent.

11. A method according to claim 5, wherein the α-type phthalocyanine composition is subjected to a wet milling in the presence of at least one solvent selected from the group consisting of:

methanol, ethanol, isopropanol, butanol, n-hexane, octane, cyclohexane, benzene, toluene, xylene, tetrahydrofuran, dioxane, diethyl ether, ethylene glycol dimethyl ether, ethylene glycol diethyl ether, acetate cellosolve, acetone, ethylmethyl ketone, cyclohexanone, isophorone, methyl acetate, ethyl acetate, dimethyl sulfoxide dimethylformamide, phenol, cresol, anisole, nitrobenzene, acetophenone, benzyl alcohol, pyridine, N-methyl pyrrolidone, quinoline, and picoline.

12. A method according to claim 8, wherein said solvent is dichloromethane.

13. A method according to claim 11, wherein said solvent is isophorone.

* * * * *